United States Patent
Hellal et al.

(10) Patent No.: US 7,136,829 B2
(45) Date of Patent: Nov. 14, 2006

(54) METHOD AND APPARATUS FOR PROVIDING A SHOPPING LIST SERVICE

(75) Inventors: Faten Fay Hellal, Mountain View, CA (US); Fletcher Jones, Bethesda, MD (US); Kamal Acharya, Los Altos, CA (US); Peter Gremett, Sunnyvale, CA (US); Jai-Jen Chang, Sunnyvale, CA (US); Matthew Crampton, Mountain View, CA (US)

(73) Assignee: America Online, Inc., Dulles, VA (US)

( * ) Notice: Subject to any disclaimer, the term of this patent is extended or adjusted under 35 U.S.C. 154(b) by 704 days.

(21) Appl. No.: 10/093,641

(22) Filed: Mar. 8, 2002

(65) Prior Publication Data

US 2003/0172005 A1    Sep. 11, 2003

(51) Int. Cl.
*G06Q 30/00*    (2006.01)

(52) U.S. Cl. .......................... 705/26; 705/27
(58) Field of Classification Search ............ 705/26, 705/27
See application file for complete search history.

(56) References Cited

U.S. PATENT DOCUMENTS

| | | | |
|---|---|---|---|
| 5,004,270 A | 4/1991 | Schaul et al. | 283/48.1 |
| 5,047,614 A | 9/1991 | Bianco | 235/385 |
| 5,361,871 A | 11/1994 | Gupta et al. | 186/61 |
| 5,630,068 A | 5/1997 | Vela et al. | 395/201 |
| 5,696,366 A | 12/1997 | Ziarno | 235/380 |
| 5,754,981 A | 5/1998 | Veeneman et al. | 705/26 |
| 5,774,874 A | 6/1998 | Veeneman et al. | 705/27 |
| 5,870,716 A | 2/1999 | Sugiyama et al. | 705/26 |
| 5,898,594 A | 4/1999 | Leason et al. | 364/479.01 |
| 5,970,474 A | 10/1999 | LeRoy et al. | 705/27 |
| 5,999,914 A | 12/1999 | Blinn et al. | 705/26 |
| 6,026,376 A | 2/2000 | Kenney | 705/27 |
| 6,076,091 A | 6/2000 | Fohn et al. | 707/102 |
| 6,609,106 B1* | 8/2003 | Robertson | 705/26 |
| 2001/0037259 A1* | 11/2001 | Sharma et al. | 705/26 |

FOREIGN PATENT DOCUMENTS

WO    WO 20039738 A1 *    7/2000

OTHER PUBLICATIONS

Making a List . . . and checking the sites; it's easier than ever to tell Santa what you want for Christmas by Posting your own on-line Holiday wish Lists; Elizabeth Owens; Dec. 23, 1999.*

* cited by examiner

*Primary Examiner*—Yogesh C. Garg
*Assistant Examiner*—Rob E. Rhode, Jr.
(74) *Attorney, Agent, or Firm*—Michael A. Glenn; Glenn Patent Group

(57) ABSTRACT

A method and apparatus is disclosed that provides an Internet wish list for deferred purchasing. A user clicks on an add to wish list button located on locations, such as, a product page, a banner ad, or search results to add an item to the wish list. A reminder system is used to remind a user to purchase an item at a future time. The shopping list service may be integrated at a high level of integration and a low level of integration. On a low level of integration a proxy platform is used to add functionality to a website.

19 Claims, 5 Drawing Sheets

> Your Wish List (Save more items like those in your Wish list) — 295

Hello        Welcome to your wish list — 200

[text area] (Submit)

Sort By: [Date added ▼] (GO)        Views [All products ▼] (GO)

Items: 3 (available used: 2 items)        I want   Price   Buy

⊙ *Diamond Z200 Viper II 3D AGP Graphics Card*
by SONICblue ; Electronics        [1]   $135.94 ⊙ (Add to cart)

Date added: Jun 5, 2001        (Save changes)
Your comments: (max 255 chars)
[text field]        (Delete)

220 — *Philips DVD    DVD-Video*  [1]  $179.99 ⊙ (Add to cart) — 260
210 — ⊙ *Player*                              230
240 — by Philips; Electronics 250 — Date added: Jun 5, 2001        (Save changes)
Your comment: (max. 255 chars)
[text field]        (Delete) — 270

⊙ *John Adams*
by David McCullough;
Hardcover        [1]   $28.00 ⊙ (Add to cart)

Date added: Jun 5, 2001        (Save changes)
Your comment: (max. 255 chars)
[text field]        (Delete)

*FIG. 2*

MEAT LOAF

A hearty family meal, susceptible to many variations. The second day, slice it thin and make sandwiches on rye bread with sweet pickles.

Add to wish list
☐ ☐ ☐ ☐ ☐ ☐ ☐ ☐

410 {
- 2 cups freshly made <u>bread crumbs</u>
- 1 onion, chopped fine
- 2 eggs, slightly beaten
- 2 pounds ground beef
- 2 tablespoons Worcestershire sauce
- 1 1/2 teaspoons dry mustard
- 1 1/2 teaspoons salt
- 1/2 teaspoon freshly ground pepper
- 1/4 cup milk

[ Add All ] — 420

Preheat the oven to 350°F. Butter a loaf pan. Combine all the ingredients in a large bowl; your freshly washed hands are the best tools for the job. Pat into the loaf pan and bake for 45 minutes.

July 2001

| Monday | Tuesday | Wednesday | Thursday | Friday | Sat/Sun |
|---|---|---|---|---|---|
| | | | | | July 1 |
| | | | | | 7 |
| 2 | 3 | 4 | 5 | 6 | 8 |
| | | | | | 14 |
| 9 | 10 | 11 | 12 | 13 | 15 |
| | | | | | 21 |
| 16 | 17 | 18 | 19 | 20 | 22 |
| | -Call Lofe<br>-Anniversary<br>-Buy DVD 510 | | | | 28 |
| 23 | 24 | 25 | 26 | 27 | 29 |
| 30 | 31 | | | | |

FIG. 5

METHOD AND APPARATUS FOR PROVIDING A SHOPPING LIST SERVICE

BACKGROUND OF THE INVENTION

1. Technical Field

The invention relates generally to providing a shopping service on the Internet and, more particularly, is directed to a system for retaining shopping selections from a multitude of websites in a location from which the shopping selections can be later accessed.

2. Description of the Prior Art

Throughout the history of man, there has been the desire to acquire possessions. At the early point of man's existence, the main focus was acquiring such necessities as food and water. As man has developed over the eons, the constant drive to possess necessities has evolved to possessing non-necessities such as big screen TV's and cellular phones. One method for acquiring such non-necessities has been the shopping list. Typically a shopping list is created by a person walking through a mail, finding things that they like, and physically writing them down onto a piece of paper.

As time has passed, online or Internet shopping has become increasingly popular. Unfortunately, the development of shopping lists has not yet accompanied the development of the Internet. Currently, while online shopping lists exist, they only work on a single website. This requires a person who typically shops from many websites, to have multiple shopping lists, one from each website. Also, current Internet shopping lists do not allow a user to add items to his shopping list from a search result. And also, current shopping list systems must be highly integrated with a shopping website for the shopping list and the website to function together.

What is needed is a shopping list that works with many shopping websites. What is needed is a shopping list that can add an item from a search result. What is needed is a shopping list that can add an item from a website that is not highly integrated with the shopping list system.

SUMMARY OF THE INVENTION

A method and apparatus is disclosed that provides a shopping list service such as a wish list for deferred purchasing. The shopping list comprises information, such as the name of the item, a brief description of the item, the date the item was added to the list, and a link to a product page for the item.

To add an item to the shopping list, a user clicks on an add to wish list button located on web locations such as, a product page, a banner ad, or search results. When a user views his shopping list he performs such functions as, viewing the items on the list, removing items from the list, linking to a product page and purchasing the item.

A reminder system is used to remind a user to purchase an item at a future time. The shopping list service is integrated in such ways as, a high level of integration and a low level of integration. When integrated at a low level, a proxy platform is used to add buttons, such as, a buy button and an add to wish list button. The proxy platform is an intermediate website with which the shopping website is viewed.

BRIEF DESCRIPTION OF THE DRAWINGS

FIG. 2 is a diagram illustrating a wish list web page according to the invention;

FIG. 4 is a diagram illustrating a recipe with an add all button according to the present invention; and FIG. 5 is a diagram illustrating a reminder page according to the present invention.

DESCRIPTION OF THE PREFERRED EMBODIMENT

Figure 1A:
FIGS. 1A and 1B are diagrams illustrating a website product page with and without an add to wish list button according to the invention.

FIG. 1A illustrates a typical shopping website page 100. The website sells DVD players. The website page displays the name of the DVD player 110, the price 120 is and the quantity selected 130.

Figure 1B:
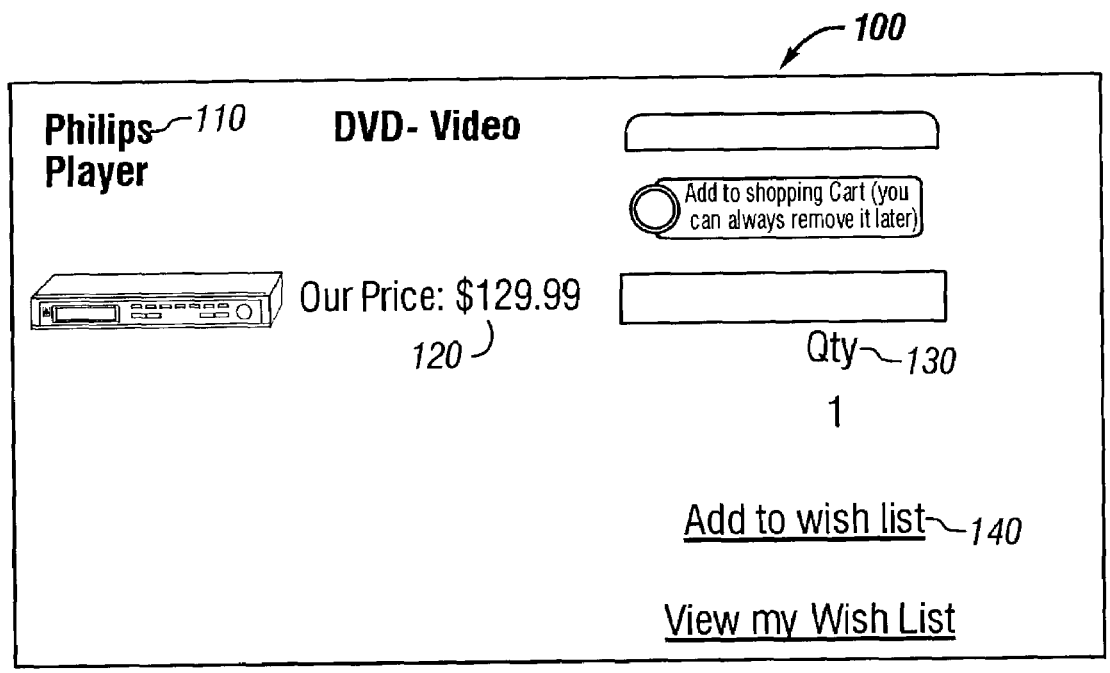

FIG. 1B illustrates the same web page with an Add to Wish List button 140. Activation of the Add to Wish List button 140 adds the product to the user's shopping/wish list.

FIG. 2 illustrates a preferred embodiment of the wish list 200. The wish list 200 records item and web page information, more particularly, purchase information, so that a user can track the selected products. The wish list records the product name 210, URL 220, price 230, manufacturer 240, and the date 250 that the product was added to the wish list. The shopping/wish list system automatically checks the URL on a routine basis to ensure that it is still valid. A user purchases the item by pressing the add to shopping cart button 260 on the wish list page. A user also views items similar to the items on his wish list by selecting the See more items like those in you Wish List button 285. A user accesses the wish list either by logging on through a login site or by automatically being logged on through an Internet service provider such as AOL produced by America Online Inc. of Vienna, Va.

In a preferred embodiment, URL information for website items are tracked by correlating the URL for a product to the product's stock keeping unit (SKU). Each product or item has a unique SKU number. The SKU number does not change. However, URL's often change. As pages are changed, so are the products' URL's. Using the SKU as an intermediate reference allows a validation process to point to the current URL from the SKU. When the wish list system checks a website to see if a URL is valid, it reads the SKU value of the item, then reads the corresponding URL listed by the website, and checks the URL value with the URL kept by the shopping list system. If the URL values match, then the URL is valid. If the URL's do not match, then it is not valid.

Figure 3:
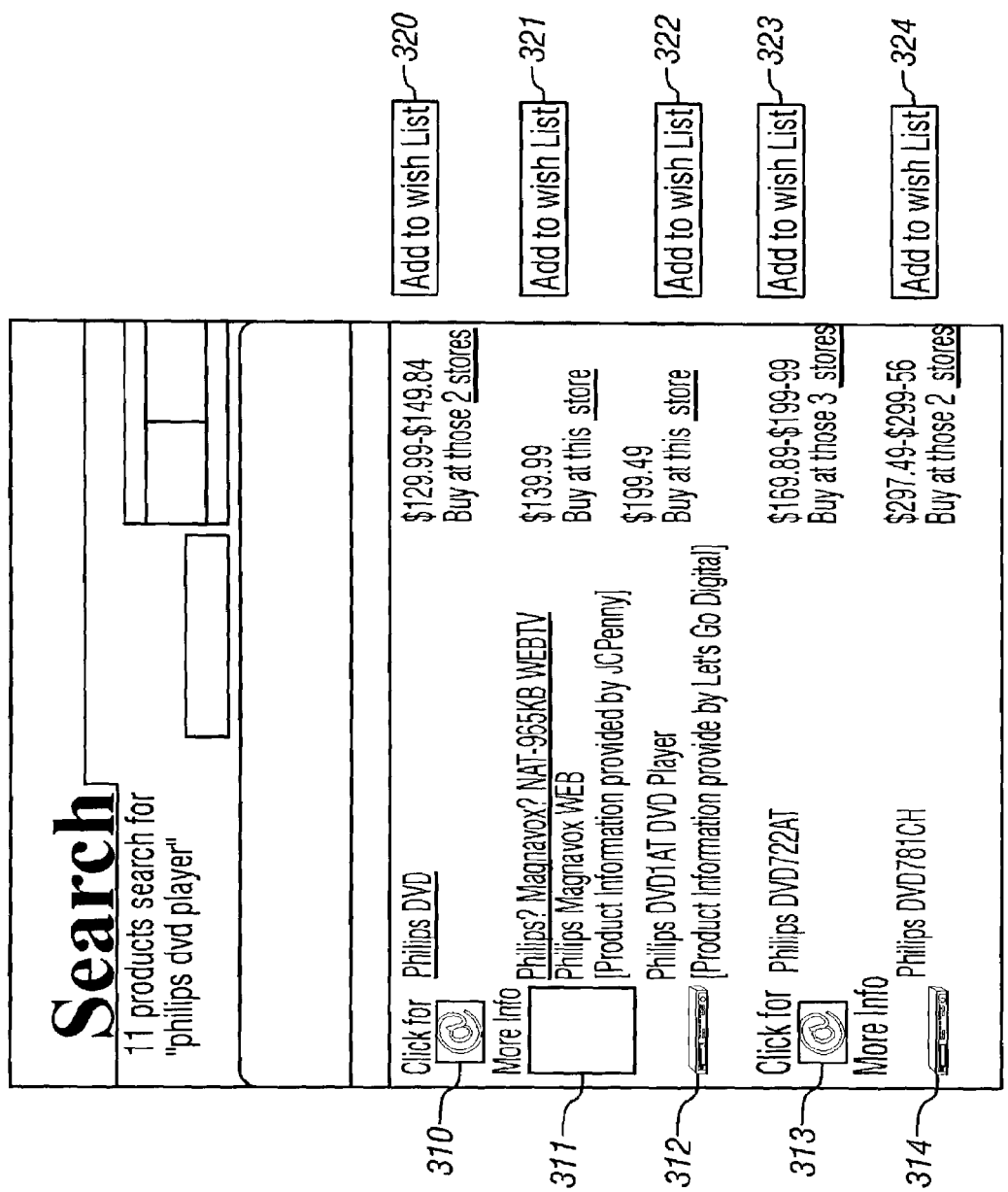
FIG. 3 is a diagram illustrating a search result that contains add to wish list buttons according to the present invention.

An item is added to the wish list by several other methods. One such method is by pressing an Add to Wish List button located next to an item listed in a search result. FIG. 3 illustrates the search results for a DVD player. Beside each listed DVD player 310, 311, 312, 313, 314 is an Add to Wish List button 320, 321, 322, 323, 324. Pressing of a button 320 adds the corresponding item 310 to the wish list. Search results are obtained from multiple merchants who are part of the wish list system. Other methods of adding items to the wish list include pressing an add to wish list button located on, a banner ad, a decision guide, a promotional browser window, a personal shopper's toolbar and a product page. Items are removed from the wish list by selecting the item and pressing the delete button 270. A user can also save search results onto his wish list.

Promotions such as coupons are typically offered through a promotional browser window that pops up when a user views his wish list. The coupons typically relate to items on the user's wish list. The coupons are offered for a limited time.

FIG. 4 illustrates a web page 400 listing the items 410 for a recipe. A user saves all the items 410 on the recipe by pressing the Add All button 420. Add all buttons are provided where it is likely that a user will purchase many related items at once. Examples are, but not limited to, recipes, pieces of gym equipment, a book series and computer parts.

The user has the option to name his wish list. Typically the name of wish lists relates to events, such as, weddings, birthdays, and anniversaries. These lists can be merged to create a single list. Also, the wish lists of multiple users can be merged together.

Once a wish list is accessed, the user has multiple options. One such option is clicking on a wish list item link 220 to access the item's product page 100. Another such option is that he purchases the item from the wish list page by activating a buy is button or begins the process of purchasing the item by pressing the Add to cart button 260.

A user shares his wish list with others by several ways. One such way is to make the wish list accessible through the user's profile. The wish list is accessible by another person while viewing the user's profile. In a preferred embodiment, the user's profile is accessed by typing in the user's screen name in a user search window available through the wish list service host. The user has the option to preclude others from searching through his wish list. Also, the user can set up a password step that a potential wish list viewer must enter before he views the wish list.

Alternatively, the user shares his wish list by emailing a link to the wish list. The email provides a link to the user's profile and/or wish list, where the email recipient then views it.

In a preferred embodiment, the buy button and/or shopping cart purchase system is linked to a cyber wallet. A cyber wallet typically resides on a client computer system, and performs financial transactions, such as purchases, by communicating with a server application on a server computer system. For example, a user on a client computer system decides to purchase software from a server computer system that is belongs to a software vendor. Protocols such as the Secure Electronic Transactions (SET) protocol and the Open Trading Protocol (OTP) enable the server computer system to receive a payment for the software from a cyber wallet on the client computer system. Using these protocols, this payment is automatically deducted from an account linked to the cyber wallet on the client computer system, and is automatically credited to an account linked to an application on the server computer system.

The wish list system keeps statistical data on the items saved on the wish list. The statistical data kept is, but not limited to, number of users creating wish lists, average number of products added per wish list, total number of products wished for, average number of products wished for per list, the link which led to the creation of the wish list, number of click-throughs generated by the wish list, number of public lists, number of shared lists, average number of recipients per shared list, number of guest viewers of all wish lists, number of removed products per list, number of purged lists, top twenty most popular products, number of anonymous wish lists created, number of anonymous wish lists saved, and the number of Jot-It-Down buttons. An anonymous wish list is a wish list for a user choosing to sign into an associated user registration process anonymously, whereby such wish list may be kept for a temporary amount of time, such as, for example, thirty days. A Jot-It-Down button is a button linking to a Jot-It-Down feature within the user's wish list. Such feature allows the user to enter a description and a date and a time for when to check the wish list, and, optionally create an associated link in the user's calendar for such date and time back to the wish list.

FIG. 5 illustrates a calendar system 500 that enables a user to set future reminders. A user selects a date 510 and then enters information 520 that will be used to remind him at a later time. Such information includes, but is not limited to, anniversaries, birthdays, and when to purchase a product. A user is able to configure the calendar to automatically purchase an item on the user's wish list on a future date. The item is automatically purchased by receiving information from the user's cyber wallet. Price-based alerts remind the user to purchase a product if the product should equal or fall below a designated price.

In another embodiment, the buy and add to wish list buttons are added to a website that is not highly integrated. Typically, a high level of integration is required between a website and a cyber wallet provider and/or a cyber mall to add functions such as, a buy and add a wish list button. A proxy platform adds these buttons with a low level of integration. The proxy is described in the co-pending U.S. patent application Ser. No. 10/017,662, *Proxy Platform Integration System* (filed Dec. 14, 2001) and is commonly assigned to Netscape Communications, Inc. of Mountain View, Calif., which application is incorporated herein in its entirety by this reference thereto.

The proxy platform acts as an intermediate website that alters the appearance of another website. A user views the website through the proxy. The proxy platform adds, removes or rearranges elements on the website. The proxy platform adds functional elements such as a button that interacts with the website. To the user, the integration of the website and the proxy platform is seamless, such that the user believes what he is seeing is an unaltered website.

A buy button on the proxy platform provides automatic form filling by accessing the user's cyber wallet and relaying purchase information to a merchant website. Each piece of information is designated properly and entered onto the merchant's purchase form. The add to wish list button adds items to the user's wish list.

A proxy platform is created by parsing a website, and mapping the elements of the website. Rules are created that designate how the elements of the website are to be manipulated. For example, in addition to manipulating the website by adding and removing elements, web elements can be manipulated by moving them around the page such that the layout of the web elements are different than the original.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for providing an Internet shopping list service comprising:
    a shopping list capable of containing items from at least two merchant websites, retained
on a computer memory:
    a computer for adding and subtracting at least one item from a one of said at least two merchant web sites on said shopping list;
    an add to wish list button located on said one of said at least two merchant web sites for adding and subtracting said item onto, and off of, said shopping list, and wherein said apparatus is configured to record information by said shopping list comprising any of: the URL of said item, name of said item. description of said item, price of said item, related items, and the date said item was added to said shopping list; and if the recorded information is the URL of said item, periodically checking for validity and wherein URL of said item is referenced and correlated to the stock keeping unit of said item;

a connection for connecting said computer onto said Internet;

a reminder for providing Information to a user at a future time about said item on said shopping list; and at least one promotional item capable of being added to said shopping list; wherein a user purchases said item from said shopping list.

2. An apparatus for providing an Internet shopping list service comprising:

a shopping list means capable of containing items from at least two merchant websites, retained on a computer memory means;

a computer means for adding and subtracting at least one item from a one of said at least two merchant web sites on said shopping list means;

an add to wish list button located on said one of said at least two merchant web sites for adding and subtracting said item onto, and off of, said shopping list and wherein said apparatus is configured to record information by said shopping list comprising any of: the URL of said item, name of said item, description of said item, price of said item, related items, and the date said item was added to said shopping list; and if the recorded information is the URL of said item, periodically checking for validity and wherein URL of said item is referenced and correlated to the stock keeping unit of said item;

a connection means for connecting said computer means onto said Internet;

a reminder means for providing information to a user at a future time about said item on said shopping list means; and at least one promotional item capable of being added to said shopping list means;

wherein a user purchases said item from said shopping list means.

3. An apparatus for providing an Internet shopping list service comprising:

a shopping list capable of containing items from at least two merchant websites, retained on a computer memory;

a computer for adding and subtracting at least one item from a one of said at least two merchant web sites on said shopping list;

an add to wish list button located on said one of said at least two merchant web sites for adding and subtracting said item onto, and off of, said shopping list, and wherein said apparatus is configured to record information by said shopping list comprising any of: the URL of said item, name of said item, description of said item, price of said item, related items, and the date said item was added to said shopping list: and if the recorded information is the URL of said item, periodically checking for validity and wherein URL of said item is referenced and correlated to the stock keeping unit of said item; and a connection for connecting said computer onto said internet.

4. The apparatus of claim 3, further comprising:

a reminder for providing information to a user at a future time about said item on said shopping list.

5. The apparatus of claim 4, wherein said reminder is a calendar.

6. The apparatus of claim 5, wherein said calendar automatically purchases a shopping list item on a predetermined date.

7. The apparatus of claim 3, further comprising:

at least one promotional item capable of being added to said shopping list.

8. The apparatus of claim 3, wherein a user purchases said item from said shopping list.

9. The apparatus of claim 3, wherein shopping data is recorded, said data comprising any of:

number of users creating wish lists, average number of products added per wish list, total number of products wished for, average number of products wished for per list, the link which led to the creation of the wish list, number of click-throughs generated by the wish list, number of public lists, number of shared lists, average number of recipients per shared list, number of guest viewers of all wish lists, number of removed products per list, number of purged lists, top twenty most popular products, number of anonymous wish lists created, number of anonymous wish lists saved and the number of Jot-It-Down buttons.

10. The apparatus of claim 3, further comprising:

a merging means for merging multiple shopping lists into a single shopping list.

11. The apparatus of claim 3, wherein said shopping list has a theme comprising any of:

an anniversary, a wedding and a birthday.

12. The apparatus of claim 3, wherein said wish list is shared by means comprising any of:

distribution through email, communication of a link, and viewing a user profile.

13. The apparatus of claim 3, wherein said button for adding an item to said wish list is located on any of:

a banner ad, a decision guide, a promotional browser window, a personal shopper's toolbar and a product page.

14. The apparatus of claim 3, wherein said button adds multiple items to said wish list in a single activation.

15. The apparatus of claim 3, wherein said shopping list is accessed by means comprising any of:

a logan site and an automatic logon through an Internet service provider.

16. The apparatus of claim 3, wherein said button is associated with said item by a proxy platform.

17. The apparatus at claim 3, further comprising:

a buy button.

18. The apparatus of claim 17, wherein said buy button is associated with said item by a proxy platform.

19. The apparatus of claim 17, wherein said buy button is associated with a cyber wallet, said cyber wallet providing purchase information to conduct a purchase transaction.

* * * * *